(12) United States Patent
Schmalbuch et al.

(10) Patent No.: US 10,850,477 B2
(45) Date of Patent: Dec. 1, 2020

(54) VEHICLE COMPOSITE PANE WITH OPTIMISED BEAM PATH FOR A SENSOR MOUNTED THEREON

(71) Applicant: SAINT-GOBAIN GLASS FRANCE, Courbevoie (FR)

(72) Inventors: Klaus Schmalbuch, Goult (FR); Dirk Wohlfeil, Raeren (BE); Malte Linn, Aachen (DE); Martin Arndt, Aachen (DE); Christian Effertz, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 189 days.

(21) Appl. No.: 16/305,816

(22) PCT Filed: Jun. 19, 2017

(86) PCT No.: PCT/EP2017/064925
§ 371 (c)(1),
(2) Date: Nov. 29, 2018

(87) PCT Pub. No.: WO2018/015086
PCT Pub. Date: Jan. 25, 2018

(65) Prior Publication Data
US 2019/0329523 A1    Oct. 31, 2019

(30) Foreign Application Priority Data

Jul. 18, 2016 (EP) ..................................... 16179916

(51) Int. Cl.
*B32B 15/04* (2006.01)
*B32B 17/06* (2006.01)
(Continued)

(52) U.S. Cl.
CPC .......... *B32B 5/14* (2013.01); *B32B 17/10761* (2013.01); *G02B 26/0883* (2013.01); *G02B 27/0172* (2013.01)

(58) Field of Classification Search
USPC ................ 428/426, 428, 432, 688, 701, 702
See application file for complete search history.

(56) References Cited

U.S. PATENT DOCUMENTS 5,013,134 A * 5/1991 Smith ............... B32B 17/10568
345/7
5,593,786 A * 1/1997 Parker .................... B32B 17/10
428/426

(Continued)

FOREIGN PATENT DOCUMENTS

DE    102013210887 A1    12/2014
JP    2001-019499 A    1/2001
(Continued)

OTHER PUBLICATIONS

International Search Report for International Application No. PCT/EP2017/064925 filed Jun. 19, 2017 on behalf of Saint-Gobain Glass France. dated Sep. 20, 2017. 5 pages (English Translation + German Original).

*Primary Examiner* — Lauren R Colgan
(74) *Attorney, Agent, or Firm* — Pillsbury Winthrop Shaw Pittman LLP

(57) ABSTRACT

A vehicle composite pane having an outer pane made of glass and an inner pane made of glass that are bonded to one another via a polymeric intermediate layer is presented. According to one aspect, the intermediate layer includes a first wedge inlay and a second wedge inlay that are made of different materials, each of the inlays being wedge-shaped and having a wedge face. According to another aspect, the wedge faces are positioned one atop the other so that, in the direction from a lower edge to an upper edge of the (Continued)

Figure 1:
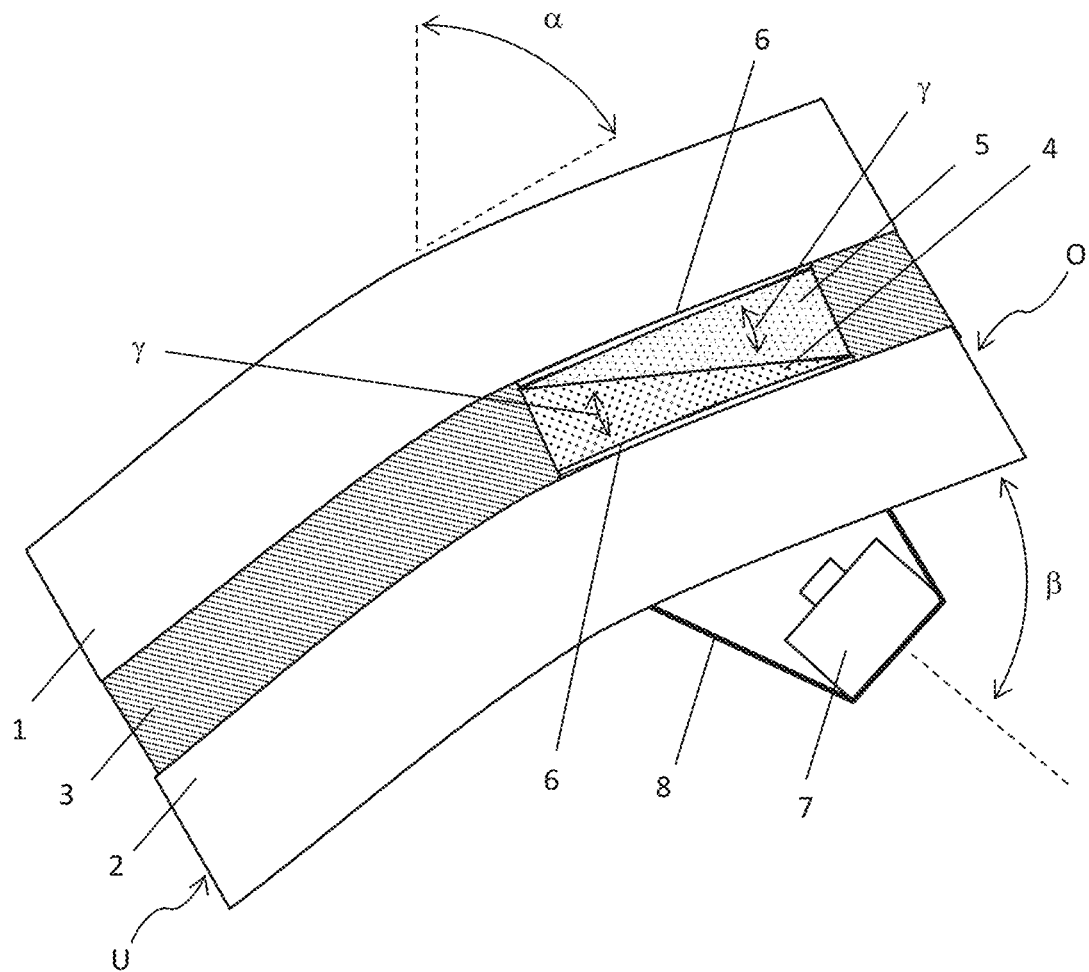

composite pane, the thickness of the first wedge inlay increases and the thickness of the second wedge inlay decreases. According to a further aspect, at least one of the wedge inlays has a refractive index that differs from the refractive index of the outer pane and of the inner pane.

19 Claims, 3 Drawing Sheets

(51) Int. Cl.
*B32B 5/14* (2006.01)
*B32B 17/10* (2006.01)
*G02B 26/08* (2006.01)
*G02B 27/01* (2006.01)

(56) References Cited

U.S. PATENT DOCUMENTS

| | | | |
|---|---|---|---|
| 6,473,250 B1 | 10/2002 | Chapman et al. | |
| 7,037,005 B2 * | 5/2006 | Kreger | G02B 26/0891 396/427 |
| 9,915,822 B2 * | 3/2018 | Arndt | G03B 21/62 |
| 10,350,859 B2 * | 7/2019 | Arndt | B32B 17/10541 |
| 10,656,414 B2 * | 5/2020 | Arndt | B32B 17/10568 |
| 10,678,050 B2 * | 6/2020 | Kremers | G02B 27/0101 |
| 2002/0008926 A1 * | 1/2002 | Freeman | B32B 3/02 359/894 |
| 2002/0086141 A1 * | 7/2002 | Sauer | B32B 17/10339 428/156 |
| 2002/0150744 A1 * | 10/2002 | Nagai | B32B 27/40 428/215 |
| 2004/0053006 A1 * | 3/2004 | Omizu | B65H 18/28 428/156 |
| 2006/0008658 A1 * | 1/2006 | Fukatani | B32B 17/10697 428/437 |
| 2006/0228529 A1 | 10/2006 | Liposcak | |
| 2007/0098969 A1 * | 5/2007 | Ansems | B32B 17/10761 428/212 |
| 2007/0148472 A1 * | 6/2007 | Masaki | B32B 17/10036 428/426 |
| 2008/0176043 A1 * | 7/2008 | Masaki | B32B 17/10036 428/172 |
| 2008/0284850 A1 | 11/2008 | Blaesing et al. | |
| 2009/0294212 A1 * | 12/2009 | Miyai | B32B 17/10 181/289 |
| 2012/0164409 A1 * | 6/2012 | Masaki | B32B 17/10559 428/203 |
| 2013/0252001 A1 * | 9/2013 | Sablayrolles | C08K 5/1345 428/437 |
| 2017/0274631 A1 * | 9/2017 | Oota | C01G 41/02 |
| 2017/0297310 A1 * | 10/2017 | Mannheim Astete | B32B 17/10036 |
| 2018/0104934 A1 * | 4/2018 | Mori | B32B 17/06 |
| 2019/0248113 A1 * | 8/2019 | Kaplan | B32B 17/10165 |

FOREIGN PATENT DOCUMENTS

| | | |
|---|---|---|
| JP | 2005-206445 A | 8/2005 |
| JP | 2007-223883 A | 9/2007 |
| JP | 2009-528943 A | 8/2009 |
| JP | 2011-088781 A | 5/2011 |
| WO | WO 2015/072538 A1 | 5/2015 |

* cited by examiner

VEHICLE COMPOSITE PANE WITH OPTIMISED BEAM PATH FOR A SENSOR MOUNTED THEREON

CROSS REFERENCE TO RELATED APPLICATIONS

The present application is the U.S. National Stage of International Patent Application No. PCT/EP2017/064925 filed on Jun. 19, 2017, which, in turn, claims priority to European Patent Application No. 16179916.8 filed on Jul. 18, 2016.

The invention relates to a vehicle composite pane, a method for its production, and its use.

Modern vehicles are equipped with an increasing number of optical sensors whose signals are used to assist the driver. Examples of such sensors are cameras such as video cameras or night vision cameras, rain sensors, light sensors, or distance meters. Forward-aimed sensors are frequently fastened on the interior-side surface of the windshield, typically centrally in the vicinity of the upper edge. The sensors are obscured by a masking print on the windshield. For this, the customary, peripheral, frame-like masking print, which serves primarily as UV protection for the assembly adhesive of the windshield, is significantly enlarged in the direction of the centre of the pane in the region of the sensors.

Conventional sensors are mounted on the windshield such that their detection direction runs horizontally. Since the windshield is installed in the vehicle greatly inclined, for example, at an installation angle of 60° relative to the vertical, the detection direction of the sensor encloses a very acute angle of approx. 30° with the windshield. This yields a relatively large, substantially trapezoidal so-called "sensor region" (or "sensor window") of the windshield. The sensor region is that region of the windshield by which radiation passing through the sensor is detected. The sensor region of the windshield is, thus, the region that lies in the detection beam path of the sensor.

The more sensors to be fastened on the pane, the more area of the windshield is occupied by the total of the sensor regions, and the larger the masking print intended to obscure the sensors has to be. However, this reduces the total light transmittance through the pane and it frequently is less attractive aesthetically.

The sensor region of the windshield can be reduced by selecting the angle between the sensor and the windshield as large as possible, ideally 90°. However, in order for the detection direction of the sensor to remain aimed horizontally forward, the detection beam path must be accordingly deflected in or behind the pane. For this, coupling elements that are mounted between the sensor and the pane are known and due to their refractive index guide the radiation passing through the pane horizontally into the sensor. Such a coupling element or light guide element is known, for example, from US 2008/0284850 A1. However, an outside mounted coupling element increases the space required for attachment parts and is vulnerable to damage.

The object of the present invention is to provide a further improved vehicle composite pane by means of which the size of the sensor region of a mounted sensor is reduced.

The object of the present invention is accomplished according to the invention by a vehicle composite pane according to the disclosure. Preferred embodiments are also apparent from the disclosure.

The vehicle composite pane according to the invention comprises at least an outer pane and an inner pane that are bonded to one another via a polymeric intermediate layer. The outer pane and the inner pane are typically made of glass. The vehicle composite pane is provided for separating a vehicle's interior from an external environment. The vehicle composite pane is, thus, a window pane that is inserted in a window opening of the vehicle body or is intended for this. The vehicle pane according to the invention is, in particular, a windshield of a motor vehicle. The term "inner pane" refers to that pane which is intended, in the installed position, to be turned toward the interior of the vehicle. The term "outer pane" refers to that pane that is intended, in the installed position, to be turned toward the external environment of the vehicle. That surface of the respective pane that is turned toward the external environment in the installed position is referred to as the outside surface. That surface of the respective pane that is turned toward the interior of the vehicle is referred to as the interior-side surface.

The composite pane is, in particular, intended and suitable for a sensor to be attached on its inner pane. For this, the surface of the inner pane turned away from the intermediate layer can be equipped with suitable mounts, for example, with a bracket or housing. The region of the composite pane that is arranged in the detection beam path of the sensor and is intended for that is referred to as the "sensor region" or "sensor window", Radiation that enters the sensor region through the composite pane is detected by the sensor.

One region of the intermediate layer is made of a first wedge inlay and a second wedge inlay. The two wedge inlays are made of a different material, in particular, materials with different refractive indices. Said region of the intermediate layer corresponds at least to the sensor region, but can also be larger. The size of said region of the intermediate layer is, for example, from 10 cm$^2$ to 100 cm$^2$, preferably from 25 cm$^2$ to 50 cm$^2$.

The two wedge inlays are in each case wedge-shaped, in particular, in the form of a right-angled wedge. Each wedge inlay has two bases positioned on one another, in particular, positioned approximately perpendicular to one another, and a wedge face connecting the bases. This means that each of the three faces is connected to the other two faces, with two opposite side edges forming the connection edges such that the faces joined have a triangular cross-section. The wedge faces of the two wedge inlays are preferably placed congruently with an opposing wedge direction: in the direction from the lower edge to the upper edge of the composite pane, the thickness of the first wedge inlay increases and the thickness of the second wedge inlay decreases.

A right-angled wedge has three substantially quadrangular, in particular, rectangular, surfaces. The first and second rectangular surfaces are connected along a connecting edge at a right angle relative to one another. Due to the low thickness of a vehicle composite pane, one of said surfaces is significantly longer than the other; in the context of the invention, the two surfaces are consequently referred to as the "long base" and the "short base". The third surface connects to the side edges of the long and short bases that are opposite the right-angled connection edges and connects them. This surface encloses in each case an acute angle with the long and short base and is referred to, in the context of the invention, as a "wedge face" (inclined surface). The angle between the long base and the wedge face is referred to in the context of the invention as a "wedge angle". The wedge also has two triangular end faces that complete the shape.

The two wedge faces of the two wedge inlays are positioned one atop the other such that the two wedge inlays together form a rectangular solid wherein the two long bases and two short bases of the two wedge inlays are opposite each other in each case and are arranged parallel to one another. The long bases of the two wedge inlays form two opposite primary surfaces of the rectangular solid, via which one wedge inlay is connected to the outer pane and the other wedge inlay is connected to the inner pane. The short bases run between the pane surfaces, in particular approximately perpendicular to the pane surfaces. The interface of the two wedge inlays formed by the adjacent wedge faces runs obliquely between said primary surfaces, and, indeed, such that the wedge direction is arranged vertically. This means that the direction in which the wedges change their thickness corresponds to the direction between the upper edge and the lower edge of the composite pane. The upper edge is that side edge that is intended, in the installed position, to point upward toward the vehicle roof (roof edge). The lower edge is that side edge that is intended, in the installed position, to point downward toward the engine compartment (engine edge).

The above description of the wedge-shaped wedge inlays and their arrangement together as a rectangular solid is based on the non-curved initial state of the wedge inlays. Since actual vehicle windows are frequently curved and the flexible polymeric wedge inlays conform to the curvature, the wedge inlays in the finished composite pane deviate from the ideal wedge form. Thus, the two primary surfaces and also the interface between the wedge inlays are slightly curved and the angle between the side edges can change slightly compared to the non-curved initial state. The person skilled in the art will still recognise the wedge inlays and the inventive concept even in the finished, curved pane.

Also, the description of the right-angled wedge inlays that form a rectangular solid assumes that the surfaces of the glass panes facing the intermediate layer are arranged parallel to one another. In actual panes, slight deviations from the ideal shape can occur. This is, in particular, the case when the surfaces of the glass panes are not parallel. Such non-parallel panes are common, for example, in conjunction with head-up displays (HUD) in order to overlay display images generated by reflection on the two outer surfaces of the composite pane in order to thus avoid so-called "ghost images". To this end, composite panes for HUDs are typically produced with a wedge-shaped laminating film. The deviations from the ideal right-angled wedge form of the individual wedge inlays and from the ideal rectangular solid of the assembled wedge inlays are, however, slight such that the person skilled in the art can clearly recognise the inventive concept.

That wedge inlay whose thickness increases in the direction from the lower edge to the upper edge of the composite pane is referred to in the context of the invention as the "first wedge inlay". That wedge inlay whose thickness decreases in the direction from the lower edge to the upper edge of the composite pane is referred to in the context of the invention as the "second wedge inlay". In one embodiment of the invention, the first wedge inlay faces the outer pane and is connected thereto, whereas the second wedge inlay faces the inner pane and is connected thereto. In an alternative embodiment of the invention, the first wedge inlay faces the inner pane and is connected thereto, whereas the second wedge inlay faces the outer pane and is connected thereto.

The two wedge inlays preferably have substantially the same shape and are complementarily arranged one atop the other, in other words with a different wedge direction.

At least one of the two wedge inlays has a refractive index that differs from the refractive index of the outer pane and of the inner pane. Thus, the radiation passing through the sensor region is advantageously deflected. In a conventional vehicle composite pane that typically consists of two panes of soda lime glass and a PVB intermediate layer, no significant changes in the refractive index occur within the composite pane. A beam passing horizontally through the pane is displaced in parallel, but remains horizontal even after passing through the pane such that the sensor must be oriented parallel to the horizontal in order to detect the beam. By means of the at least one wedge inlay with a different refractive index, the horizontally incident beam can be deflected such that the sensor no longer has to be arranged horizontally, but, instead, can be arranged with a larger angle relative to the composite pane. Thus, due to simple geometric considerations, the sensor region of the composite pane becomes smaller and takes up less area of the composite pane, as a result of which the masking print for concealing the sensor can also be designed smaller. In particular, when a plurality of sensors are present in proximity to one another, the invention is particularly advantageous because an excessively large masking print to conceal the entire sensor region can be avoided.

In order to achieve an advantageous deflection of the radiation, the difference between the refractive index of the wedge inlay and the refractive index of the outer pane and the inner pane should be at least 0.1. Particularly good results are obtained when the difference is at least 0.2. In the context of the invention, the refractive index is measured at a wavelength of 550 nm.

The larger the wedge angle, the greater the deflection of the radiation, and the more pronounced the inventive effect. Limits are, however, set for the size of the wedge angle by the geometric dimensions, with, in particular, the short base of the wedge inlay limited by the pane thickness, or the distance between the outer and the inner pane. The wedge angle of the two wedge inlays should be at least 1°, preferably at least 2° in order to effect advantageous deflection of the radiation.

The refractive index of the outer pane and of the inner pane is preferably identical and is preferably from 1.4 to 1.6, particularly preferably from 1.5 to 1.6, or from 1.45 to 1.55, in particular from 1.50 to 1.55. The outer pane and the inner pane of vehicle composite panes are typically made of soda lime glass. Soda lime glass has refractive indices from 1.5 to 1.6, in particular from 1.5 to 1.55, for example 1.52. However, in principle, other types of glass can also be used, such as borosilicate glass (refractive index, for example, 1.47), aluminosilicate glass (refractive index, for example, 1.5), or quartz glass (refractive index, for example, 1.46). The thickness of the outer pane and of the inner pane is typically from 0.5 mm to 5 mm, preferably from 1 mm to 3 mm.

The outer pane and the inner pane are bonded to one another by a polymeric intermediate layer. This means that the greater part of the intermediate layer is formed from a polymeric, typically thermoplastic material and provides for the adhesion between the panes. This thermoplastic material is typically arranged outside the region with the wedge inlays according to the invention and formed from at least one thermoplastic film. The wedge inlays themselves can likewise be formed from a polymeric material. However, the wedge inlays can also be formed from non-polymeric organic or inorganic materials, for example, a crystalline structure.

The object of the invention is the enlargement of the required angle between the sensor and the composite pane. This can be achieved in that the first wedge inlay has a larger refractive index than the outer pane and the inner pane. The refractive index of the first wedge inlay is preferably from 1.6 to 2.0, particularly preferably from 1.65 to 1.8. The person skilled in the art can, in principle, select the material of the wedge inlays freely so long as it has a suitable refractive index and satisfies the optical requirements with regard to transparency. As a material for the first wedge inlay, plastics can, for example, be selected that are common for eyeglass lenses with refractive indices of approximately 1.5 to 1.74 and are available commercially, for example, polycarbonate (PC), such as poly allyl diglycol carbonate (PADC).

Alternatively, the second wedge inlay can have a smaller refractive index than the outer pane and the inner pane. The refractive index of the first wedge inlay is, in this case, preferably from 1.1 to 1.45, particularly preferably from 1.2 to 1.4. The second wedge inlay can, for example, contain or be made of magnesium fluorite.

A particularly advantageous effect is achieved by a combination of the above described embodiments, wherein the first wedge inlay has a refractive index that is greater than the refractive index of the outer pane and of the inner pane and the second wedge inlay has a refractive index that is smaller than the refractive index of the outer pane and of the inner pane, with the above indicated preferred ranges of values. Thus, the radiation to be detected can be deflected particularly efficiently.

However, it suffices for only one of the wedge inlays to have a refractive index different from the panes in order to achieve the effect according to the invention. Thus, the first wedge inlay can have a refractive index that is greater than the refractive index of the panes, whereas the second wedge inlay has a refractive index that corresponds substantially to that of the glass panes. For example, the first wedge inlay can be made of polycarbonate such as PADC and the second wedge inlay made of PVB or PMMA.

The polymeric intermediate layer outside the region with the wedge inlays according to the invention is implemented from at least one thermoplastic film (laminating film), preferably containing ethylene vinyl acetate (EVA), polyvinyl butyral (PVB) or polyurethane (PU) or mixtures or copolymers or derivatives thereof, particularly preferably PVB. The thickness of the thermoplastic film is preferably from 0.2 mm to 2 mm, particularly preferably from 0.3 mm to 1 mm, for example, 0.38 mm or 0.76 mm. The intermediate layer can also be implemented from a plurality of films placed one atop another or from layers made of a different material, for instance, as is the case with films with noise-reducing properties.

Since the wedge angle of the wedge inlays is primarily limited by the thickness of the intermediate layer, in a preferred embodiment, a thicker than usual intermediate layer is used. The typical thickness of an intermediate layer of windshields and other motor vehicle glazings is 0.76 mm. The preferred thickness of the intermediate layer according to the invention is at least 1 mm, for example, from 1.2 to 1.8 mm. Thus, the achievable wedge angles are increased without the laminated glass as a whole becoming too thick to be acceptable for motor vehicle glazings.

In a preferred embodiment, the thermoplastic laminating film has a cutout into which the wedge inlays can be inserted with a precise fit such that the wedge inlays are surrounded in a frame-like manner by the thermoplastic laminating film. Alternatively, the frame-like surround can also be achieved in that a plurality of pieces or strips of the laminating film are assembled around the wedge inlays.

Optionally, the wedge inlays can be joined to the surface of the outer pane and of the inner pane in each case via a thin adhesive film. The adhesive film preferably contains EVA, PVB, or PU or mixtures or copolymers or derivatives thereof, particularly preferably PVB. The thickness of the adhesive film is preferably from 0.02 mm to 0.15 mm. However, since the adhesion of the panes is ensured by the large area laminating film, the use of the adhesive film is not essential. Even if the pane surfaces and the wedge inlays form no adhesive bond, the stability of the bond achieved by means of the laminating film is not significantly reduced by the wedge inlays. The wedge inlays are securely fixed by the precisely fitting insertion into a cutout of the laminating film and the contact pressure of the two glass panes.

The thickness of the rectangular solid made up of the wedge inlays, optionally in addition to the thickness of the adhesive films, should, of course, correspond to the thickness of the at least one laminating film outside the sensor region in order to ensure an intermediate layer of constant thickness and a stable bond.

A further aspect of the invention is an arrangement comprising a vehicle composite pane according to the invention and an optical sensor mounted thereon that is fastened on the interior-side surface of the inner pane facing away from the intermediate layer is aimed at the sensor region of the composite pane, i.e., the region with the wedge inlays. The detection beam path of the sensor thus runs through the wedge inlays in the composite pane. The optical sensor is preferably an optical camera, in other words, a camera with sensitivity in the visible spectral range, for example, a lane camera or a camera for an augmented reality head-up display.

By means of the wedge inlays according to the invention, the sensor can be arranged at a greater angle relative to the composite pane, as a result of which the sensor region of the composite pane becomes smaller. This effect is understandable based on simple geometric considerations: the sensor region corresponds to the cut area through the detection wedge of the sensor on the position of the composite pane. This area is minimal at an angle of 90° and increases as the angle becomes smaller. Typically, windshields are arranged with an installation angle relative to the vertical of approximately 60°. In the case of curved panes, the tangential plane in the geometric centre of the pane is used for determination of the installation angle. A conventional forward-aimed sensor with horizontal orientation thus encloses an angle of approximately 30° relative to the windshield. As a result of the deflection of the detection beam path by means of the wedge inlays according to the invention, the angle can be advantageously enlarged. In a preferred embodiment, the sensor is arranged at an angle from 45° to 90° relative to the composite pane. For the exact determination, even in the case of curved panes, the angle between the central detection direction of the sensor (centre of the detection wedge) and the tangential plane in the geometric centre of the sensor region on the interior-side surface of the inner pane must be used.

The outer pane, the inner pane, or the intermediate layer can be clear and colourless, but also tinted, frosted, or coloured. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The outer pane and the inner pane can be made of non-prestressed, partially prestressed, or prestressed glass.

The vehicle pane is preferably curved in one or a plurality of spatial directions, as is customary for motor vehicle panes, with typical radii of curvature in the range from approximately 10 cm to approximately 40 m. The laminated glass can, however, also be flat, for example, when it is provided as a pane for buses, trains, or tractors.

The outer pane and/or the inner pane preferably have a masking print. Masking prints are customary for vehicle panes, outside the central field of vision, to conceal attachment parts or to protect the adhesive with which the vehicle pane is joined to the car body against UV radiation. The masking print typically consists in a black or dark enamel applied and fired in the screen printing method. Preferably, the masking print frames the sensor region of the composite pane circumferentially, in order to conceal the sensor position therebehind.

It is a particular advantage of the invention that the radiation deflecting element is integrated directly into the composite pane and no attachment parts such as coupling elements or light guide elements are necessary. Consequently, in a preferred embodiment, the composite pane has no attachment parts between the sensor and the inner pane.

The invention also includes a method for producing a vehicle composite pane, wherein
(a) an outer pane and an inner pane with a polymeric intermediate layer therebetween are arranged areally one atop the other, wherein a region of the intermediate layer is formed from a first wedge inlay and a second wedge inlay made of a different material, which are wedge-shaped and have in each case a wedge face, wherein the wedge faces are placed one atop the other such that in the direction from a lower edge to an upper edge of the composite pane, the thickness of the first wedge inlay increases and the thickness of the second wedge inlay decreases, and wherein at least one wedge inlay has a refractive index that differs from the refractive index of the outer pane and of the inner pane,
(b) the outer pane is bonded by lamination to the inner pane via the intermediate layer.

The intermediate layer preferably includes, in addition to the wedge inlays, at least one thermoplastic film that preferably has a precisely fitting cutout for the wedge inlays. The two panes and the film having the wedge inlays therebetween are, of course, flat and arranged substantially congruently one atop the other. The stack is subsequently subjected to customary methods for producing composite panes. The outer pane is bonded by lamination to the inner pane via a polymeric intermediate layer, which is formed during the process from the at least one thermoplastic film with the wedge inlays. This is done with customary methods known to the person skilled in the art, for example, autoclave methods, vacuum bag methods, vacuum ring methods, calender methods, vacuum laminators, or combinations thereof. The bonding of the outer pane and the inner pane is customarily done under the action of heat, vacuum, and/or pressure.

An adhesive film can be inserted between the wedge inlays and the respective associated glass pane.

If the vehicle composite pane is to have a curvature, as is customary in particular for passenger cars, the panes are subjected to a bending process before lamination, for example, by gravity bending, suction bending, and/or press bending. Typical bending temperatures are from 500° C. to 700° C.

An opaque masking print is preferably applied on the edge region of the outer pane and/or of the inner pane prior to lamination and prior to the optional bending. For this, a black or dark enamel is typically applied by screen printing and fired prior to lamination, in particular prior to bending or during bending.

The invention also includes the use of a vehicle composite pane according to the invention as a windshield of a vehicle, preferably a motor vehicle. In a preferred embodiment, an optical sensor that is aimed at the region of the composite pane with the wedge inlays and which is an optical camera, i.e., is sensitive in the visible spectral range, for example, a lane camera or a camera for an augmented reality head-up display, is attached on the interior-side surface of the inner pane facing away from the intermediate layer.

In the following, the invention is explained in detail with reference to drawings and exemplary embodiments. The drawings are a schematic representation and are not true to scale. The drawings in no way restrict the invention.

Figure 2:
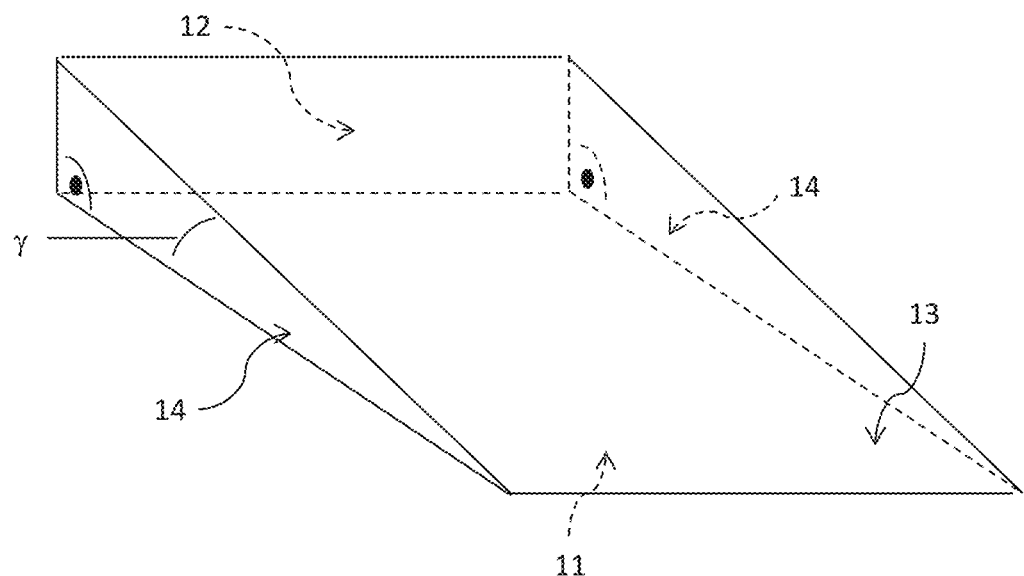
Figure 3:
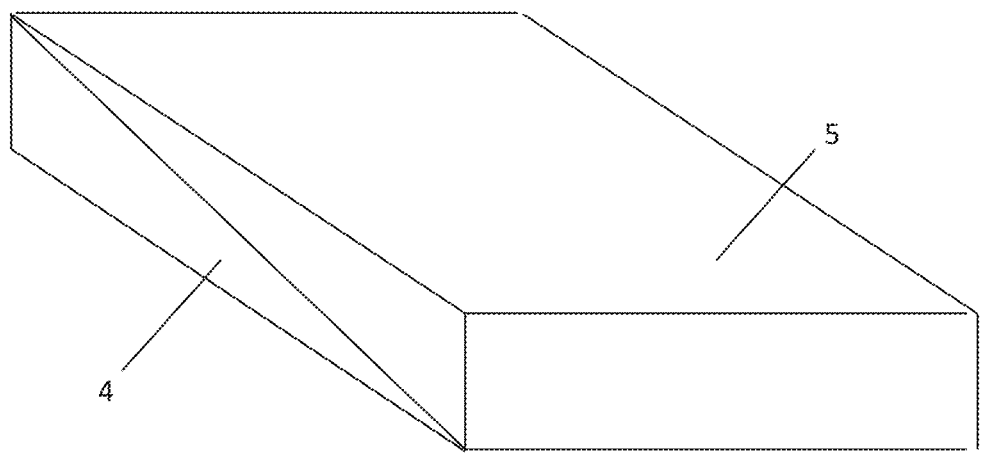
Figure 4:
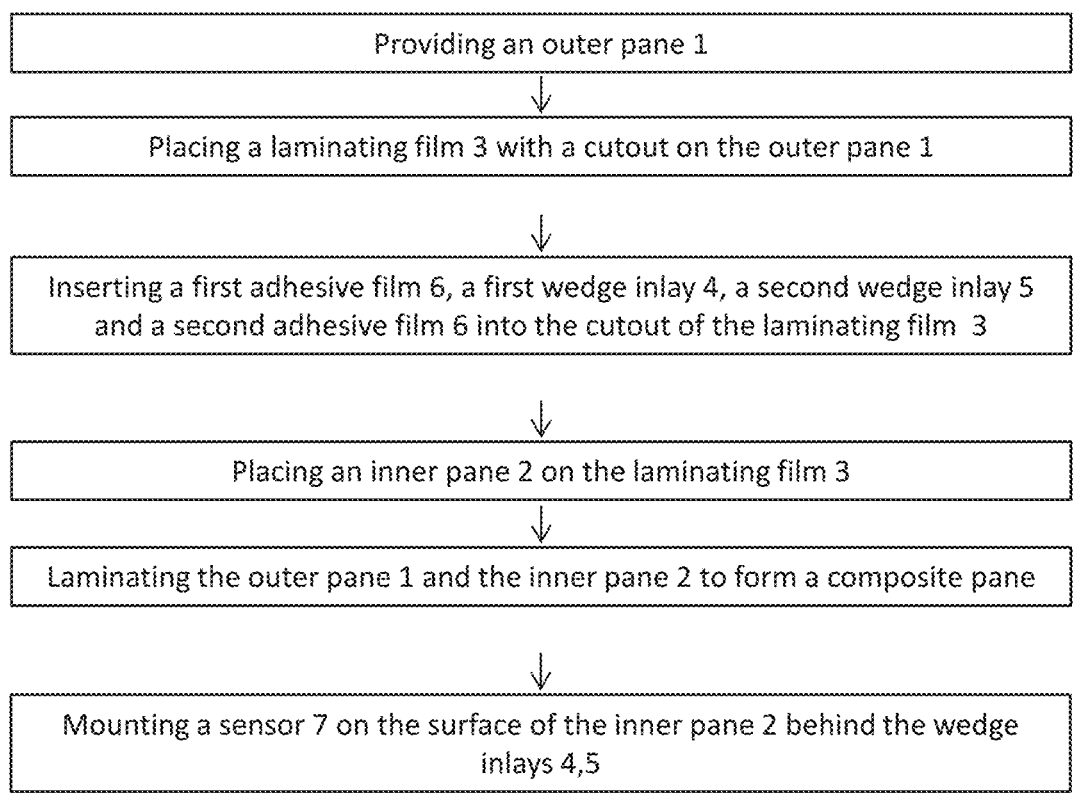

They depict:

FIG. 1 a cross-section through one embodiment of the vehicle composite pane according to the invention having an optical sensor, FIG. 2 a perspective view of a wedge inlay according to the invention, FIG. 3 a perspective view of two wedge inlays positioned one atop the other according to the invention, and FIG. 4 a flowchart of one embodiment of the method according to the invention.

FIG. 1 depicts a vehicle composite pane according to the invention that is provided as a windshield of a passenger car. The composite pane is made up of an outer pane 1 and an inner pane 2 that are areally bonded to one another by means of a thermoplastic laminating film 3. The outer pane 1 and the inner pane 2 are made of soda lime glass and have, for example, a thickness of 2.1 mm. The laminating film 3 is a 0.76-mm-thick PVB film. The inner pane 2 faces the vehicle interior in the installation position. The outer pane 1 faces the external environment of the vehicle in the installation position. The composite pane has an upper edge O and a lower edge U. The upper edge O points, in the installation position, upward towards the vehicle roof; the lower edge U points, in the installation position, downward towards the engine compartment.

The interior-side surface of the outer pane is bonded to the exterior-side surface of the outer pane via the thermoplastic intermediate layer. Customarily, the exterior-side surface of the outer pane is referred to as "Side I"; the interior-side surface of the outer pane as "Side II"; the exterior-side surface of the inner pane as "Side III"; and the interior-side surface of the inner pane as "Side IV".

On the interior-side surface of the inner pane 2, a camera 7 is arranged in a housing 8. The camera is, for example, a lane camera. The detection direction of the camera 7 is aimed outside of the composite pane approximately horizontally forward. Radiation that passes horizontally through the composite pane in a so-called "sensor region" is detected by the camera.

The composite pane is installed in the vehicle, as customary for windshields, at an installation angle α of 60° relative to the vertical. In the case of a conventional composite plane, the camera 7 would have to be aimed horizontally, which would result in an acute angle β of approximately 30° relative to the anterior-side surface of the inner pane 2.

Instead, in the case of the composite pane according to the invention, the sensor region is in a region in which the intermediate layer is formed by two wedge inlays 4, 5.

FIG. 2 depicts the basic shape of the wedge inlays 4, 5. They have a right-angled wedge shape. They have a long base 11 and a short base 12 that are joined to one another in a substantially right angle via a connection edge. The side edges opposite the right-angled connections edges of the base 11, 12 are joined to one another by a so-called "wedge face" 13. This shape is completed by two triangular end faces 14. The angle between the long base 11 and the wedge face 13 is referred to as a wedge angle γ.

FIG. 3 depicts the relative arrangement according to the invention of the two wedge inlays 4, 5. The wedge faces 13 of the wedge inlays 4, 5 are positioned complementarily such that the wedge inlays 4, 5 together form a sort of rectangular solid in which the two long bases 11 are positioned opposite one another, as are the two short bases 12. The two right-angled connection edges of the wedge inlays 4, 5 are diagonally opposite one another and form opposite, nonadjacent side edges of the rectangular solid. In other words, the two wedge inlays 4, 5 are positioned one atop the other via their wedge faces 13 such that in one spatial direction, the thickness of one wedge inlay 4 increases and the thickness of the other wedge inlay 5 decreases.

FIG. 1 depicts how the wedge inlays 4, 5 are arranged in the composite pane. The wedge direction (i.e., the direction, in which the thickness of the wedge inlay changes) runs vertically, i.e., in the direction between the lower edge U and the upper edge O. The thickness of the first wedge inlay 4 increases in the direction from the lower edge U toward the upper edge O. Consequently, the thickness of the second wedge inlay 5 decreases in the direction from the lower edge U toward the upper edge O. The long base 11 of the first wedge inlay 4 is bonded to the interior-side surface of the outer pane 1 via a 50-μm-thick PVB film. The long base 11 of the second wedge inlay 5 is likewise bonded to the exterior-side surface of the inner pane via a 50-μm-thick PVB film. The short bases 12 run approximately perpendicular between the panes 1, 2.

The two wedge inlays 4, 5 are made of a different material and have refraction indices that differ significantly from one another and from the refractive index of the outer pane 1 and of the inner pane 2. The panes 1, 2 made of soda lime glass have a refractive index of 1.52. The first wedge inlay 4 is made, for example, from a plastic that is marketed by the company Hoya under the tradename Eyvia 1.74 for eyeglass lenses and has a refractive index of 1.74. However, other plastics for eyeglass lenses are also suitable, for example, the products from the company Hoya with the tradenames Eynoa 1.67 and Eyas 1.60, where the number in the tradename indicates the respective refractive index. The second wedge inlay 5 is made, for example, from magnesium fluorite with a refractive index of 1.38. The radiation passing horizontally from the outside through the composite pane is refracted downward by the different refractive indices and the wedge angle γ of, for example, 2°. Thus, the camera 7 can be arranged at a less acute angle β of, for example, 60° relative to the interior-side surface of the inner pane 2. Thus, the space requirement for the sensor region on the composite pane can be advantageously reduced. The sensor region results, namely, from the cut area that is created by the cutting of the composite pane by the detection cone of the camera 7. The size of this cut area is minimal at an angle β of 90° and increases with the decreasing value of β. The major advantage of the invention resides in the enlargement of the angle β compared to a conventional composite pane and the reduction in size of the sensor region associated therewith.

As depicted in the figure, windshields are typically curved. This results in the fact that the shape of the wedge inlays 4, 5 and of the rectangular solid formed thereby deviates slightly from the ideal shape described, since the polymeric, flexible wedge inlays 4, 5 adapt to the curved shape.

FIG. 4 depicts a flowchart of an exemplary embodiment of the method according to the invention for producing a vehicle composite pane.

EXAMPLE

Simulations were carried out to investigate and demonstrate the technical effect of the invention. The simulations were based on an installation angle cc of the composite pane of 60°, a thickness of the intermediate layer of 1.2 mm, a refractive index of the outer pane 1 and of the inner pane 2 of 1.52, a refractive index of the first wedge inlay 4 of 1.78, and a refractive index of the second wedge inlay 5 of 1.38. The size of the wedge inlays 4, 5 was 35 mm (vertical)×30 mm (horizontal). The wedge inlays 4, 5 had a wedge angle γ of 2.2°.

The outcome of the simulation showed that the installation angle β of the camera 7 could be increased by 3° due to the light refraction of the wedge inlays 4, 5. This resulted in a reduction in size of the sensor region of the pane by 70%.

LIST OF REFERENCE CHARACTERS (1) outer pane
(2) inner pane
(3) thermoplastic laminating film
(4) first wedge inlay
(5) second wedge inlay
(6) adhesive film
(7) sensor/camera
(8) housing
(11) long base
(12) short base
(13) wedge face
(14) end faces
(α) installation angle of the composite pane
(β) installation angle of the sensor/of the camera 7
(γ) wedge angles of the wedge inlays 4, 5
O upper edge/roof edge of the composite pane
U lower edge/engine edge of the composite pane

The invention claimed is:
1. A vehicle composite pane, comprising:
a polymeric intermediate layer;
an outer pane made of glass; and
an inner pane made of glass that is bonded to the outer pane via the polymeric intermediate layer,
wherein a region of the polymeric intermediate layer is formed from a first wedge inlay and a second wedge inlay made of a material that is different from a material of the first wedge inlay,
wherein each of the first wedge inlay and the second wedge inlay is wedge-shaped and comprises a respective first wedge face and second wedge face,
wherein the first wedge face and the second wedge face are positioned one atop the other so that, in a direction from a lower edge to an upper edge of the composite pane, a thickness of the first wedge inlay increases and a thickness of the second wedge inlay decreases, and
wherein at least one of the first wedge inlay and the second wedge edge inlay has a refractive index that differs from a refractive index of the outer pane and of the inner pane.

2. The vehicle composite pane according to claim 1, wherein the first wedge inlay has a refractive index that is greater than the refractive index of the outer pane and of the inner pane and/or the second wedge inlay has a refractive index that is smaller than the refractive index of the outer pane and of the inner pane.

3. The vehicle composite pane according to claim 2, wherein the second wedge inlay has a refractive index that is smaller than the refractive index of the outer pane and of the inner pane.

4. The vehicle composite pane according to claim 1, wherein a difference between the refractive index of the outer pane and of the inner pane and the refractive index of at least one of the first wedge inlay and of the second wedge inlay is at least 0.1.

5. The vehicle composite pane according to claim 4, wherein the difference is at least 0.2.

6. The vehicle composite pane according to claim 1, wherein the first wedge inlay has a refractive index of 1.6 to 2.0.

7. The vehicle composite pane according to claim 6, wherein the first wedge inlay has a refractive index of 1.65 to 1.8.

8. The vehicle composite pane according to claim 7, wherein the first wedge inlay contains polycarbonate (PC).

9. The vehicle composite pane according to claim 7, wherein the second wedge inlay has a refractive index of 1.1 to 1.45.

10. The vehicle composite pane according to claim 7, wherein the second wedge inlay has a refractive index of 1.2 to 1.4.

11. The vehicle composite pane according to claim 10, wherein the second wedge inlay contains magnesium fluorite.

12. The vehicle composite pane according to claim 1, wherein the first wedge inlay and the second wedge inlay have a respective wedge angle of at least 1°.

13. The vehicle composite pane according to claim 1, wherein the first and second wedge inlays are respectively bonded to a surface of the outer pane and to a surface of the inner pane via an adhesive film.

14. The vehicle composite pane according to claim 1, wherein the first and second wedge inlays are surrounded in a frame-like manner by a thermoplastic laminating film.

15. The vehicle composite pane according to claim 1, further comprising an optical sensor,
wherein the optical sensor is fastened on a surface of the inner pane facing away from the intermediate layer, and
wherein the optical sensor is aimed at a region of the composite pane that includes the first and second wedge inlays.

16. The vehicle composite pane according to claim 15, wherein the optical sensor is arranged at an angle of 45° to 90° relative to the composite pane.

17. A method for producing a vehicle composite pane, the method comprising:
providing an inner pane made of glass;
providing an outer pane made of glass;
providing a polymeric intermediate layer,
wherein a region of the polymeric intermediate layer is formed from a first wedge inlay and a second wedge inlay made of a material that is different from a material of the first wedge inlay,
wherein each of the first wedge inlay and the second wedge inlay is wedge-shaped and comprises a respective first wedge face and second wedge face,
wherein the first wedge face and the second wedge face are positioned one atop the other so that, in a direction from a lower edge to an upper edge of the composite pane, a thickness of the first wedge inlay increases and a thickness of the second wedge inlay decreases, and
wherein at least one of the first wedge inlay and the second wedge edge inlay has a refractive index that differs from a refractive index of the outer pane and of the inner pane;
areally arranging the outer pane and the inner pane one atop the other with the polymeric intermediate layer therebetween; and
bonding by lamination the outer pane to the inner pane via the intermediate layer.

18. A method, comprising:
providing a vehicle composite pane according to claim 1; and
using the vehicle composite pane as a windshield of a vehicle.

19. The method according to claim 18, further comprising:
fastening an optical camera on a surface of the inner pane facing away from the polymeric intermediate layer so to aim the optical camera at a region of the composite pane that includes the first and second wedge inlays.

* * * * *